July 24, 1928.
W. H. LONGCOR
FRUIT GATHERER'S KNIFE
Filed Aug. 1, 1927
1,678,570
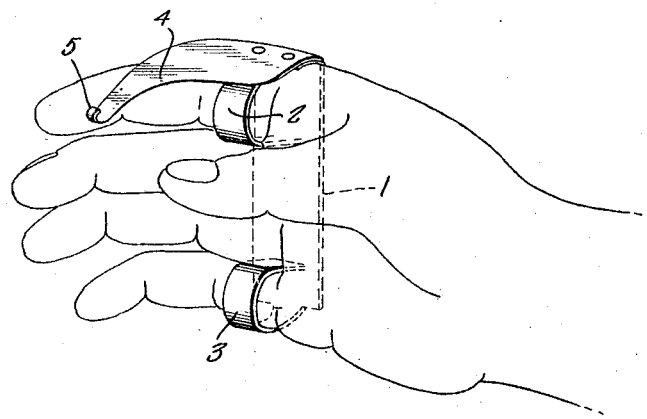
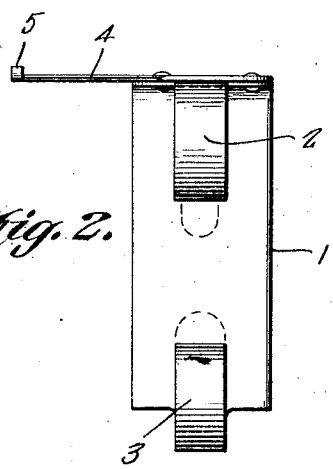
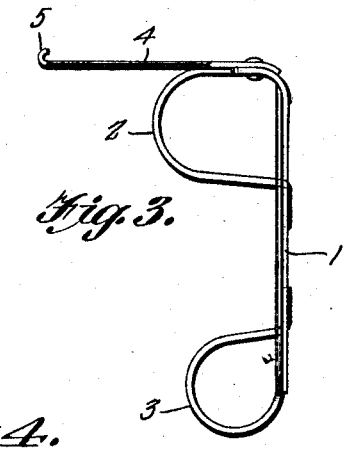
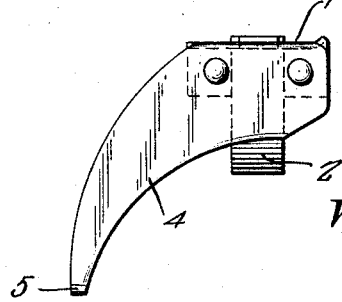
William H. Longcor, INVENTOR
BY Victor J. Evans, ATTORNEY
WITNESS:

Patented July 24, 1928.

1,678,570

UNITED STATES PATENT OFFICE.

WILLIAM H. LONGCOR, OF DINUBA, CALIFORNIA, ASSIGNOR OF ONE-HALF TO OLA NIALSON, OF DINUBA, CALIFORNIA.

FRUIT-GATHERER'S KNIFE.

Application filed August 1, 1927. Serial No. 210,006.

My present invention has reference to improvements in fruit picking implements and has reference particularly to a knife for cutting hanging or stemmed fruit, such as grapes, and aims to provide an implement for this purpose which is arranged upon the back of the hand of the operator, gripped upon the fore and little fingers and having an outwardly arched or curved blade disposed directly over the forefinger of the operator, and whereby all of the fingers and thumb of the operator are movable to assist the knife in cutting the stem and for gripping the severed bunches of grapes and depositing the same into a receptacle therefor without liability of injury thereto.

A further object is the provision of a device for this purpose that is extremely simple in its construction, that may be cheaply manufactured and which is thoroughly efficient in its practical use.

To the attainment of the above broadly stated objects, the invention consists in the improvement as hereinafter described and definitely claimed.

In the drawings:

Figure 1 is a perspective view illustrating the application of the improvement.

Figure 2 is a front elevation thereof.

Figure 3 is a side elevation thereof.

Figure 4 is a top plan view thereof.

In carrying out my invention I make use of a metal plate 1. This plate at its ends is either provided with or has integrally formed thereon loops 2 and 3, respectively, the said loops extending from the plate in the same direction. The loop 2 is of a size to receive the forefinger of the operator therethrough and the loop 3 is of a size to receive the little finger of the operator therethrough. On the outer end of the plate 1, provided with the loop 2 there is fixed a knife or cutter blade 4 that extends from the plate in the same direction as the loop. The knife 4 projects a considerable distance beyond the loop and has its cutting edge concaved, as clearly disclosed by the drawings. The blade from its connection with the plate 1 on the loop 2 gradually decreases in thickness and the outer end thereof is rounded upwardly and inwardly upon itself, as at 5. This serves as a protector for the operator.

The device is arranged on the hand of the operator as clearly disclosed by Figure 1 of the drawings, and the forefinger of the operator passes through the loop 2 and the little finger through the loop 3 so that the back of the hand rests directly on the plate 1. The remaining fingers and the thumb of the operator are free from engagement with the device. A bunch of grapes or like fruit is gripped between the fingers and thumb of the hand of the operator and the hand is moved to present a shearing cut between the knife 4 and the stem of grapes. The stem is thus easily and quickly severed and the grapes are grasped in the hands of the operator. The manipulation of the forefinger of the operator may materially assist the knife in its action and the simplicity and advantages of the construction will, it is thought, be apparent and appreciated when the foregoing description has been read in connection with the accompanying drawing.

Having described the invention, I claim:

In a device for the purpose set forth, a plate having inwardly extending loops at the ends thereof, a cutting blade secured to one end of the plate arranged over one of the loops and extending from the plate in the same direction as the loop, said blade having its cutting edge concaved and the outer end thereof rounded upwardly and inwardly.

In testimony whereof I affix my signature.

WILLIAM H. LONGCOR.